United States Patent Office 3,365,139
Patented Jan. 23, 1968

3,365,139
CONVEYING SYSTEMS FOR FLEXIBLE
ELONGATE MATERIAL
John Maurice Wheatley, Punchbowl, New South Wales, and Alexander Wilson, Greenwich, Sydney, New South Wales, Australia, assignors to The British Oxygen Company Limited, London, England
Filed Sept. 13, 1965, Ser. No. 486,793
Claims priority, application Australia, Sept. 16, 1964, 49,350/64
11 Claims. (Cl. 242—54)

ABSTRACT OF THE DISCLOSURE

A conveying system for a flexible elongated material such as a welding wire comprises a rotatable cylindrical drum and a cylindrical guide support nonrotatably mounted in the drum so as to maintain the wire in contact with the interior surface of the drum. In operation, preloading rollers feed the welding wire into the annular space between the guide support and the drum, and the drum is rotated at the required conveying speed of the wire to apply a driving force to the wire to feed it to its consumption point.

---

This invention relates to improvements in or relating to conveying systems for flexible elongate material and more particularly, but not exclusively, for elongate flexible rods, bars, and/or strip material either of solid or hollow section and including cored or covered material. The flexible elongate material may be of either metallic or non-metallic substance and, in general, any elongate material which is not brittle or is liable to plastic deformation and/or fracture under longitudinal compressive stress, flexion and/or abrasion is suitable for use with the conveying system of the present invention.

Various conveying systems have been suggested for conveying continuous welding electrode wire from a coil of electrode wire over some distance to an automatic or semi-automatic welding gun. In such systems, solid electrode wire, such as de-oxidized mild steel wire of the type employed in known gas shielded welding processes, is conveyed to the arc zone by plain roller feeding devices.

Prior to the present invention, wire slippage had been experienced due to the nature of known plain roller feeding devices. In other devices, knurled rollers and increased roller pressure have been used in an effort to overcome wire slippage difficulties. However, in general, such devices result in deformation, both in surface and bulk distortion, of the conveyed wires. In certain cases, this distortion was undesirable or unacceptable. This occurred particularly where it had been attempted to feed electrode wire of the type mentioned over considerable distances via a tortuous path. For example, in the erection of welded fuel storage tanks it has been generally necessary to transport the electrode wire feed unit and electrode wire feed coil to within a reasonable distance of the workpiece. Since known wire feed units could not feed electrode wire over distances much in excess of 12 feet, frequent movement of the equipment towards the welding zone had been found necessary. This is inconvenient for operators of such welding processes and in practice reduces productive welding time.

It has been a long felt want to provide a conveying system which enables the electrode wire to be fed from a bulk electrode wire coil or supply located at, for example, ground level, to a welding gun operating at, for example, the upper portion of a fuel storage tank under construction, so achieving a more convenient utilization of the welding process.

Similarly, in many fields apart from welding applications, such as, for example, cable laying on awkward sites, and plating works handling flexible elongate material, it has long been desired to provide an effective conveying system to a remote point.

It is an object of the present invention to provide an effective conveying system which overcomes the disadvantages of known systems.

According to one aspect of the present invention, a conveying system for flexible elongated material includes, in combination, feeding means adapted to push the material towards the interior surface of a generally cylindrical drum, guide means for maintaining the material in juxtaposition on at least part of said surface and means adapted to rotate said drum at a speed corresponding to the desired conveying speed of the material. After leaving the interior surface of the cylindrical drum, the material may be guided to its point of use.

Another aspect of the present invention comprises a conveying system for a flexible elongate welding electrode including, in combination, wire feeding rollers adapted to push the electrode toward the interior surface of a cylindrical drum, fixed guide means of helical configuration within the drum, the guide means being adapted to receive the electrode and maintain it in juxtaposition on the said interior surface and means adapted to rotate said drum at a speed corresponding to the desired conveying speed of the continuous welding electrode.

After leaving the interior surface of the cylindrical drum, the electrode may be guided to the arc zone.

In general, the operation of the various conveying systems for elongate flexible material in accordance with the present invention relies on the principle that an initially small pushing force applied to the said material is amplified mechanically by frictional forces arising from its contact with the rotating drum to overcome forces resisting the movement of the material.

In order that the invention may be more clearly understood, an embodiment of a conveying system for a continuous welding electrode wire in accordance with the present invention will now be described with reference to the accompanying drawings, in which.

Figure 1:
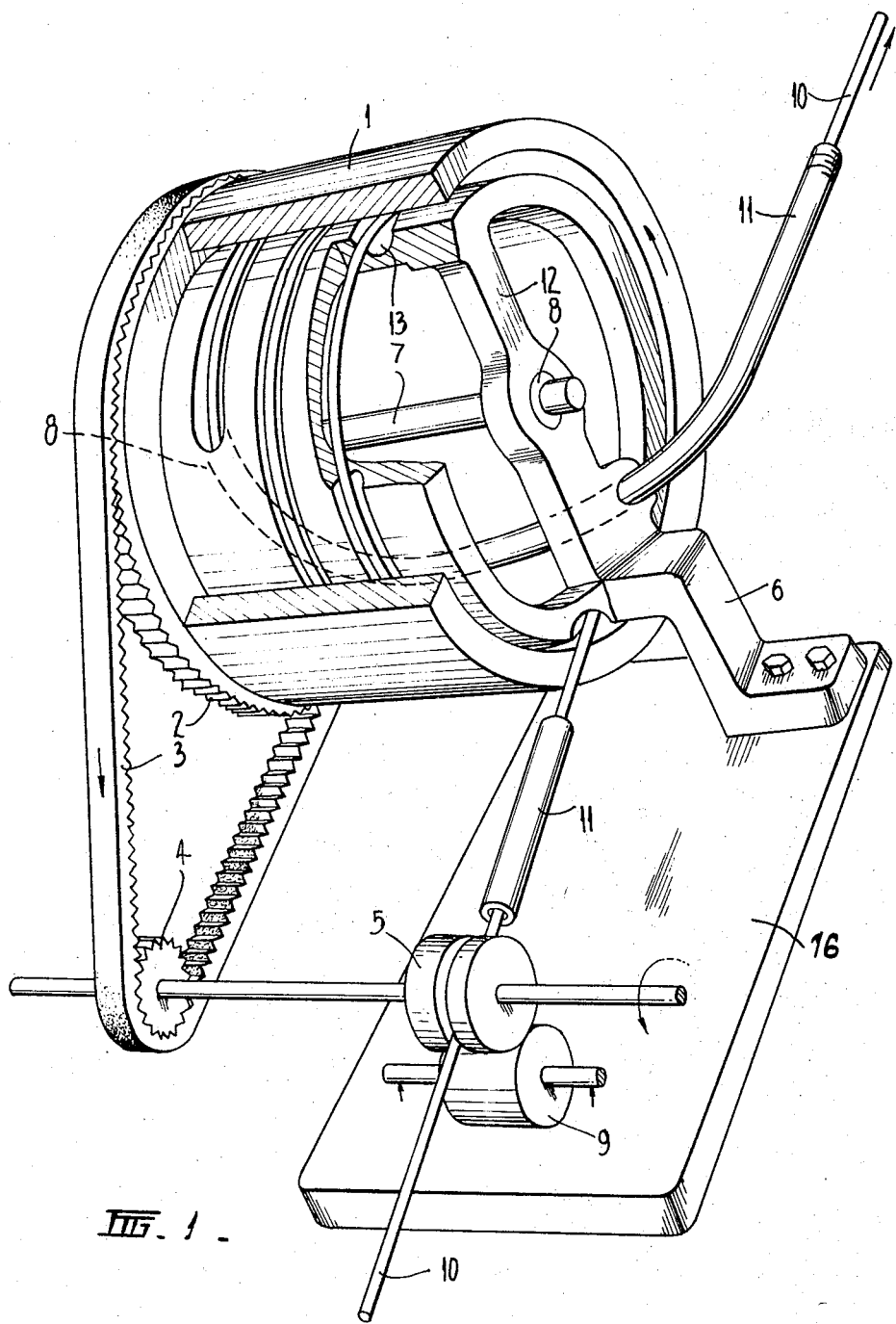
FIGURE 1 is a diagrammatic perspective view, partly in section, of an electrode wire conveying system.

With reference to FIGURE 1, a cylindrical drum 1 having one open end is fabricated by known methods such as, for example, casting from steel or other suitable material. By way of example, it may be stated that the cylindrical drum 1 may be formed with an internal diameter of 5½ inches. A ring gear 2 is firmly attached to the closed end of the cylindrical drum 1 and coaxially therewith in any suitable manner, such as by welding.

A driving chain 3 is arranged to mesh operably with the ring gear 2 and with a sprocket 4 driven by any suitable means, such as an electric motor (not shown in the drawing). This sprocket 4 is mounted coaxially with a pre-loading roller 5. The cylindrical drum 1 and ring gear 2 are supported on a bracket 6, carried on a mounting plate 16, by means of one end of a fixed axle 7 carried in bearings 8. Preloading rollers 5 and 9 are attached to the mounting plate 16 by means not fully shown, with their axes parallel to the axis of the fixed axle 7. In use, the preloading rollers 5 and 9 are adapted to push an electrode wire 10 through a guide tube 11 to the interior surface of the cylindrical drum 1.

A guide support 12 is mounted on the fixed axle 7 and carries a guiding channel 13 of semi-circular cross-section. The guiding channel 13 is arranged in a helical configuration close to the interior surface of the cylindrical drum 1.

The guiding channel 13 is adapted to receive the electrode wire 10 which follows a substantially helical path as shown in FIGURE 1, adjacent to the interior surface of the cylindrical drum 1. As shown, the electrode 10 leaves the system on the same end of the cylindrical drum 1 which it entered. The electrode 10 upon leaving the cylindrical drum 1 is fed to an arc welding gun via a conduit of known type. If desired, the electrode 10 could be arranged to leave the opposite end of the cylindrical drum 1 by a suitable construction.

In conventional roller drive systems, as mentioned above, the drive of the wire is dependent entirely upon the friction between the rollers and the wire. With the conveying system of the present invention, only a slight pressure is required at the rollers to feed the wire to the drum which is designed to be a reasonably short distance away and the driving force supplied by the rollers, in co-operation with the friction of the drive of the welding gun, maintains the wire correctly adjacent to the interior surface of the drum 1. It will be appreciated that the force due to frictional effects in the welding gun and its associated bearings acts in the opposite direction to the preloading force given by the preloading rollers 5 and 9 so that the wire is maintained in effective juxtaposition adjacent to the interior surface of the cylindrical drum 1.

The rollers 5 and 9 should, in theory, be larger than the sprocket 4, so that the rollers tend to over-supply when feeding the wire into the guiding channel 13. Thus, the rollers 5 and 9 will slip to a small degree, which is preferable to an under-supply of wire to the drum interior.

It has been found with the conventional plain roller feeding devices that damage occurs to the surface of the wire before the limiting push load can be applied to the wire. In the case of the system of the present invention, it is possible to push the wire right to the limit of the column strength of the wire, which is less than the compressive strength of the material, and even at the point of column strength failure, the wire surface is not seriously marked.

The equation connecting the loads is as follows:

$$T_2 = T_1 e^{2\pi u n}$$

Where:

$T_2$ = the output force on the wire
$T_1$ = the input force on the wire
$u$ = coefficient of sliding friction of the wire on the drum
$n$ = number of turns of wire on the drum.

Figure 2:
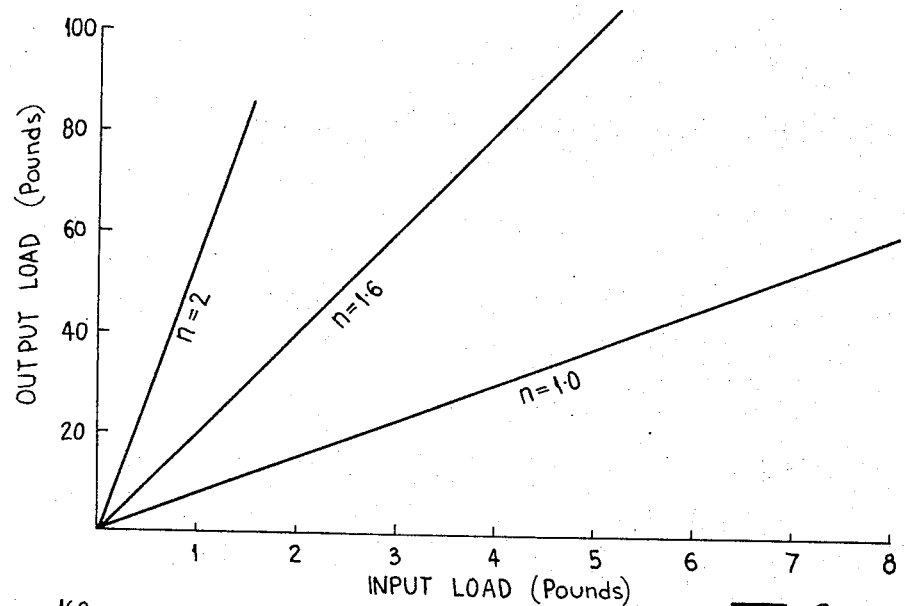
FIGURE 2 is a graph showing the relationship of output force to input force on the wire with variation in the number of turns of wire on the drum of the conveying system.

The graph in FIGURE 2 shows the relationship of the output force to the input force with variations in the number of turns, $n$, it being assumed for this purpose that $\pi u = 1$.

Figure 3:
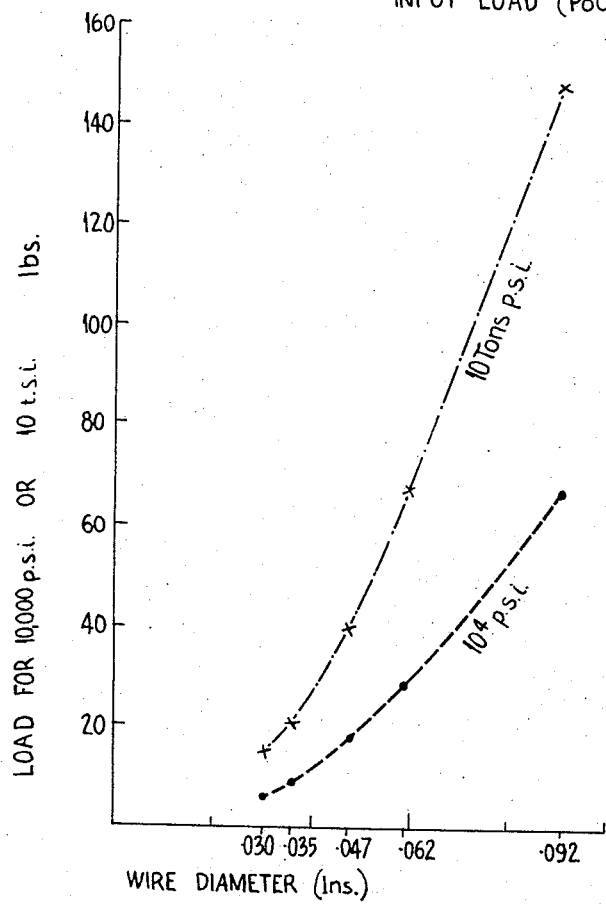
FIGURE 3 is a graph showing the relationship between compressive strength failure load and wire diameter.

The graph in FIGURE 3 of the drawings shows the relationship between compressive strength failure loads for the respective diameters of the wires.

It is apparent that even with one and a half turns of wire it is possible to supply sufficient force to the wire to make it fail in compression. In the case of aluminum, the coefficient of friction is higher and a reduced number of turns is necessary in order to provide the limiting compressive force.

In use, our conveying system has been found to be capable of feeding welding gauge mild steel wire up to a distance of 35 feet in a generally vertical direction around a tortuous path, and consequently wire feeding for automatic and semi-automatic welding processes can be achieved by the use of our system in a convenient manner. By way of contrast, apparatus available prior to the present invention could feed an electrode only approximately 12 feet.

In another demonstration carried out with our system, $\frac{1}{16}''$ diameter wire was pushed through 29 feet of conduit with a single 12" diameter turn at the end. The conduit was held straight from the wire feeder to the coil at the end and the wire was fed through the conduit without difficulty. In contrast, it was found that conventional wire feed systems were unable to push the $\frac{1}{16}''$ wire reliably through a straight conduit more than 16 feet in length. The conventional systems tend to suffer from slippage at the roller drive and thus to damage the wire.

If desired, by simple arrangement of a solenoid to unload the preloading rollers, the apparatus can have "instant stopping" of wire feed.

It will be appreciated by those skilled in the art that many variations of the above described embodiment are possible within the spirit and scope of the present invention as defined in the appended claims. For example, if desired, two or more such conveying systems may be operated in series to handle elongate material over large distances. A further modification envisages a multiplicity of rollers, helices and conduits feeding via a single cylindrical drum to several welding operators working on a project.

In general, the system of the present invention can be used for any applications where continuous movement of flexible elongate material of the type described is required.

Thus it will be seen that the present invention provides a simple and effective conveying system for feeding elongate flexible material, which is particularly suitable for applications such as feeding a continuous electrode to a welding gun.

We claim:

1. A conveying system for flexible elongate material comprising, in combination, a generally cylindrical drum, feeding means operative to push the material towards the interior surface of said drum, guide means operative to maintain the material in contact with at least part of said interior surface, and means operative to rotate said drum at a speed corresponding to the desired conveying speed of the material to apply a driving force to the contacting material.

2. A conveying system for flexible elongate material comprising, in combination, a generally cylindrical drum, rollers operative to push the material towards the interior surface of said drum, guide means operative to maintain the material in contact with at least part of said interior surface, and means operative to rotate said drum at a speed corresponding to the desired conveying speed of the material to apply a driving force to the contacting material.

3. A conveying system for flexible elongate material comprising, in combination, a generally cylindrical drum, feeding means operative to push the material towards the interior surface of said drum, guide means of helical configuration and fixed within said drum operative to maintain the material in contact with at least part of said interior surface, and means operative to rotate said drum at a speed corresponding to the desired conveying speed of the material to apply a driving force to the contacting material.

4. A conveying system for flexible elongate material comprising, in combination, a generally cylindrical drum, feeding means operative to push the material towards the interior surface of said drum, guide means operative to maintain the material in contact with at least part of said interior surface, means operative to rotate said drum at a speed corresponding to the desired conveying speed of the material to apply a driving force to the contacting material, and means operative to guide the material to a point of use therefor after the material has left the interior surface of said drum.

5. A conveying system for flexible elongate material comprising, in combination, a generally cylindrical drum, feeding means operative to push the material towards the interior surface of said drum, guide means comprising a cylindrical guide support mounted on a fixed axle through said drum and guiding channels carried on said guide support, said guide means being operative to maintain the material in contact with at least part of said interior surface, and means operative to rotate said drum at a speed corresponding to the desired conveying speed of the material to apply a driving force to the contacting material.

6. A conveying system for flexible elongate material comprising, in combination, a generally cylindrical drum, guide means comprising a cylindrical guide support mounted on a fixed axle through said drum, and guiding channels carried on said guide support, said channels being of semi-circular cross-section and arranged in a helical configuration close to the interior surface of said drum, and means operative to rotate said drum at a speed corresponding to the desired conveying speed of the material.

7. A conveying system for flexible elongate material comprising, in combination, a generally cylindrical drum, rollers operative to push the material towards the interior surface of said drum, guide means comprising a cylindrical guide support mounted on a fixed axle through said drum, guiding channels carried on said guide support, said channels being of semi-circular cross-section and arranged in a helical configuration close to the interior surface of said drum, said guide means being operative to maintain the material in contact with at least part of said interior surface, means operative to rotate said drum at a speed corresponding to the desired conveying speed of the material to apply a driving force to the contacting material, and means operative to guide the material to a point of use therefor after the material has left the interior surface of said drum.

8. A conveying system for a flexible elongate electrode comprising, in combination, a generally cylindrical drum, feeding means operative to push the electrode towards the interior surface of said drum, guide means operative to maintain the electrode in contact with at least part of said interior surface, and means operative to rotate said drum at a speed corresponding to the desired conveying speed of the electrode to apply a driving force to the contacting material.

9. A conveying system for a flexible elongate electrode comprising, in combination, a generally cylindrical drum, feeding rollers operative to push the electrode towards the interior surface of said drum, guide means of helical configuration and fixed within said drum operative to maintain the electrode in contact with at least part of said interior surface, means operative to rotate said drum at a speed corresponding to the desired conveying speed of the electrode to apply a driving force to the contacting material and means operative to guide the electrode to a point of use therefor after the electrode has left the interior surface of said drum.

10. A conveying system for a flexible elongate electrode comprising, in combination, a generally cylindrical drum, feeding rollers operative to push the electrode towards the interior surface of said drum, guide means comprising a cylindrical guide support mounted on a fixed axle through said drum, guiding channels carried on said guide support, said channels being of semi-circular cross-section and arranged in a helical configuration close to the interior surface of said drum, said guide means being operative to maintain the electrode in contact with at least part of said interior surface, means operative to rotate said drum at a speed corresponding to the desired conveying speed of the electrode to apply a driving force to the contacting material, and means operative to guide the electrode to a point of use therefor after the electrode has left the interior surface of said drum.

11. A method of conveying flexible elongate material comprising the steps of feeding said material towards the interior surface of a generally cylindrical drum, maintaining said material in contact with at least part of said surface, and rotating said drum at a speed corresponding to the desired conveying speed of said material to apply a driving force to the contacting material.

References Cited

UNITED STATES PATENTS

| | | | |
|---|---|---|---|
| 3,120,931 | 2/1964 | Lorenz | 242—83 |
| 3,299,245 | 1/1967 | Tinnes | 242—54 X |

LEONARD D. CHRISTIAN, *Primary Examiner.*